United States Patent [19]

Yamamoto

[11] Patent Number: 4,953,076
[45] Date of Patent: Aug. 28, 1990

[54] VERSATILE TIME DIFFERENCE COMPARISON COMPENSATION METHOD OF CONTROL SYSTEM

[76] Inventor: Nobuo Yamamoto, Mukainodanchi, 111-2917, Mawatari, Katsuta-shi, Ibaraki 312, Japan

[21] Appl. No.: 182,432

[22] Filed: Apr. 18, 1988

[30] Foreign Application Priority Data

Apr. 20, 1987 [JP] Japan ............................ 62-98067

[51] Int. Cl.$^5$ .................. G05B 11/01; G05B 15/02
[52] U.S. Cl. ............................. 364/176; 318/621; 318/632; 364/177; 364/183
[58] Field of Search ..................... 364/175–179, 364/148, 183; 318/611, 621, 622, 561, 632

[56] References Cited

U.S. PATENT DOCUMENTS

| 3,578,957 | 5/1971 | Gatlin | 364/178 |
| 4,634,946 | 1/1987 | Moulds, III et al. | 364/178 |
| 4,737,724 | 4/1988 | Porrot | 364/178 |

FOREIGN PATENT DOCUMENTS 0173521 3/1986 European Pat. Off. ............ 364/177

OTHER PUBLICATIONS

Ziegler et al–"Optimum Settings for Automatic Controllers"–Transactions of the A.S.M.E.; Nov. 1942; pp. 759–768.
Smith–"A Controller to Overcome Dead Time"–ISA Journal–Feb. 1959; vol. 6, No. 2; pp. 28–33.
Tagawa–"On the Compensation in Linear Feedback Control Systems"–IFAC World Congress/1981, Kyoto; III-125–III-130.

Primary Examiner—Joseph Ruggiero
Attorney, Agent, or Firm—Antonelli, Terry, Stout & Kraus

[57] ABSTRACT

A versatile time difference comparison compensation method of a control system, wherein a desired value or a reference value of feedback control is branched into several parts. One of the branches is directly compared with a feedback variable to obtain a first difference value and lag elements having various delay times are connected to the other of the branches, respectively, in order to make time difference comparison between the desired value or the reference value and the feedback variable to obtain second and third difference quantities, respectively. Various weighting elements receive the difference quantities inclusive of the first difference quantity to put various weights to the difference quantities and to obtain signals and the sum of the resulting signals is then calculated and the signal obtained by the sum is passed through a gain adjustment element to re-adjust a gain adaptive to a controlled system to produce an operation quantity. Feedback control is provided by compensating for the response delay of the controlled system by utilizing the time difference comparison between the desired value or the reference value and the feedback variable that has not been used conventionally, and can thus be adapted to all kinds of control equipment and control system with analog control and digital control.

6 Claims, 5 Drawing Sheets

VERSATILE TIME DIFFERENCE COMPARISON COMPENSATION METHOD OF CONTROL SYSTEM

BACKGROUND OF THE INVENTION

This invention relates to a versatile time difference comparison compensation method of a control system for control equipment and control systems, particularly for a servo mechanism, then for a continuous-data control system and for process control system and the like.

In order to accomplish any of the objects such as improvement in quickness of response, reduction of dispersibility, improvement in gain margin and/or phase margin, reduction of response to disturbance and restriction of a manipulation variable, compensation methods that have been employed conventionally in a feedback control system constituting control equipment and control system include, in the aspect of analog control, feedback control such as tachometer feedback, phase lag compensation, phase lead compensation, compensation by a PID controller (J. G. Ziegler and N. B. Nichols: "Optimum Settings for Automatic Controllers", Trans. ASME, Vol. 64, P759-768 (1942)) and a Smith's method (O. J. M Smith: "A Controller to Overcome Dead Time", ISA Journal, 6-2, P28-33 (1959)), and in the aspect of digital control, dead beat control, optimal control, adaptive control, and a compensation method by an utmost compensator (R. Tagawa: "On the compensation in linear feedback control systems (Transfer functions attainable by realizable linear compensation)", IFAC World Congress/'81, Kyoto (1981)). These many methods have mutually different characteristics and are applied suitably to a control system as the object of control.

In the case of analog control, however, further improvement cannot be expected any more by any of the methods described above in quickness of response, reduction of dispersibility and gain margin and/or phase margin. In digital control, on the other hand, a control system almost approximate to the ultimate system has now been established with expansion, development and preparation of its control theory, but it is essentially impossible to satisfy simultaneously all of the requirements ranging from the improvement in quickness of response, reduction of dispersibility, restriction of a manipulation variable, securing of stability, and so forth. Therefore, various digital control methods have been devised depending upon which of these requirements must be better satisfied or how the balance of these requirements is established. However, in any of these digital control methods, a large number of days and a great deal of labor have been necessary for the design and architecture of the system because the control system is complicated and arithmetic analysis is very difficult. Moreover, design and architecture must often be made once again from the beginning with only a limited change of a controlled system. Therefore, setting, adjustment and re-adjustment of a control apparatus containing each control method or each compensation method are generally difficult, and it is difficult to say that the control method or compensation method of digital control which takes into consideration the dead time attendant to many controlled systems and/or the delay by the processing time of a microprocessor into consideration has been established. It is also difficult to say that in both cases of analog control and digital control, each of the compensation methods or control methods in accordance with the prior art has sufficient versatility to various control equipment and control systems.

SUMMARY OF THE INVENTION

It is therefore an object of the present invention to provide a versatile time difference comparison compensation method of a control system which eliminates the problems of the prior art technique described above, and can be applied to all kinds of control equipment and control system of both analog and digital control.

It is another object of the present invention to provide a control method which is by far superior to each compensation method of analog control in the aspects of improvement in quickness of response, reduction of dispersibility and improvement in a gain margin.

It is still another object of the present invention to provide a control method whose design and architecture are incomparably easier than those of each control method or each compensation method of digital control, and which can be adjusted effectively and easily even when a dead time element exists inside the control system.

It is still another object of the present invention to provide a control method which can further improve excellent characteristics of digital control when assembled into the conventional digital control.

The construction of the present invention employed in order to solve the problems described above will be explained with reference to FIG. 1 which is a block diagram useful for explaining the principle of the invention. In the drawing, reference numeral 1 represents a desired value or a reference value; 2, 3, 4 . . . are branches; 5 is a feedback variable; 6 is a comparison with the feedback variable 5 at the branch 2; 7 is a primary difference value (or a primary error, as the same in the following); 8 and 9 are lag elements at the branches 3 and 4, respectively; 10 and 11 are time difference comparisons with the feedback variable 5 at the branches 3 and 4, respectively; 12 and 13 are secondary and third difference values (or secondary and third errors, as the same in the following), respectively; 14, 15 and 16 are weighting elements at the branches 2, 3 and 4, respectively; 17 is a sum; 18 is a gain adjustment element; and 19 is an operation quantity (inclusive of manipulation variable, as the same in the following).

In the construction of the present invention, the desired value of feedback control or the reference value 1 is branched to several branches 2, 3, 4; one of the branches 2 is compared at 6 directly with the feedback variable 5 to obtain the primary difference value 7; the lag elements 8 and 9 having various delay times are passed transmitted into the other branches 3 and 4 to make time difference comparison 10 and 11 between the desired value or the reference value 1 and the feedback variable 5 to obtain the secondary and third difference values 12 and 13, respectively; various weighting elements 14, 15 and 16 are transmitted into the difference values 7, 12 and 13 inclusive of this primary difference quantity 7 to multiply by various weights to each difference values 7, 12, 13; the sum 17 of these weighted difference values is calculated; a signal obtained by this sum is transmitted into the gain adjustment element 18 to re-adjust a gain adaptive to a controlled system and to produce the operation variable 19. The object described above can be accomplished sufficiently by setting only two branches 2 and 3, that is, the primary difference value 7 and the secondary difference value 12 as the difference values for most of the controlled systems to be controlled.

Next, the action of the invention will be described.

In the versatile time difference comparison compensation method of the control system in accordance with the present invention, the direct comparison 6 is made between the desired value or the reference value 1 and the feedback variable 5 to obtain the primary difference value 7 and moreover, the desired value or the reference value 1 itself is input into each lag element 8, 9 whose lag time is set in accordance with the response time delay of the feedback variable 5 with the forward response time delay of the whole control system resulting from the response time delay of the controlled system, the processing time delay of a microprocessor, and so forth, in order to make the time difference comparison 10 and 11 with the feedback variable 5. After each weighting element 14, 15,, 16 is received through each of the difference values 7, 12, 13 obtained in this manner for the difference values to be weighted and the sum 17 of them is calculated. The sum signal is then transmitted into the gain adjustment element 18 so as to re-adjust the gain adaptive to the controlled system and to produce the operation variable 19. Its detailed action is as follows.

Though setting of the gain of the gain adjustment element 18 is arbitrary, it is set to a suitable value so as to secure a sufficient gain margin, and then the weight of the weighting element 14 in succession to the primary difference value 7 is set to a certain optimum value which is associated with setting of the gain so that transient response is carried out in such a manner as to overcome the forward response time delay and to let the controlled variable, which is the output of the controlled system, follow up the desired value or the reference value rapidly and with minimum dispersibility or to bring it into conformity with the desired value or the reference value. Next, the weight of each weighting element 15, 16 in succession to each of the secondary and third difference values 12, 13, and the like, is set in such a manner that the sum of these weighting elements inclusive of the weight of the weighting element 14 which is in succession to the primary difference value 7 reaches the state where the following relation $a_1 + a_2 + a_3 = 1$ is established with these symbols representing the respective weight of the weighting elements 14, 15 and 16. At the same time, the delay time of each lag element 8, 9 for producing each time difference comparison 10, 11 is set to a certain optimum value associated with the forward response time delay in order to produce the operation variable 19 which provides a response of the type wherein the controlled variable has already been in conformity with the desired value or the reference value 1 at a time which is by far earlier than the forward response time delay.

The versatile time difference comparison compensation method of the control system in accordance with the present invention having the construction and action as described above is incomparably more excellent than each compensation method of analog control in every respect of the improvement in quick response, reduction of the dispersibility and the improvement in the gain margin, and provides quick response and excellent dispersibility characteristics that are equivalent to each control method or compensation method of digital control. Moreover, as to design and architecture, the method of the present invention can be carried out incomparably easily than each control method or compensation method of digital control and can make easy adjustment even when a dead time element exists inside the control system. When incorporated in the conventional digital control systems, the method of the present invention has the possibility of further improving the excellent characteristics of digital control.

BRIEF DESCRIPTION OF THE DRAWINGS

The present invention will become more obvious from the following detailed description when taken in conjunction with the accompanying drawings, wherein.

DESCRIPTION OF THE PREFERRED EMBODIMENT

Figure 1:
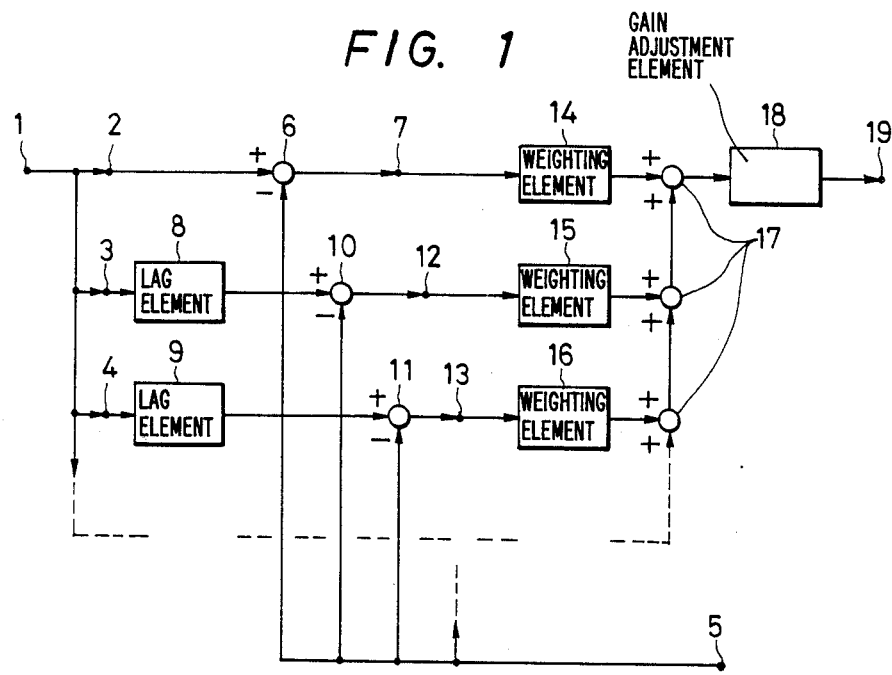
FIG. 1 a block diagram useful for explaining the principle of the versatile time difference comparison compensation method of a control system in accordance with the present invention.
Figure 2:
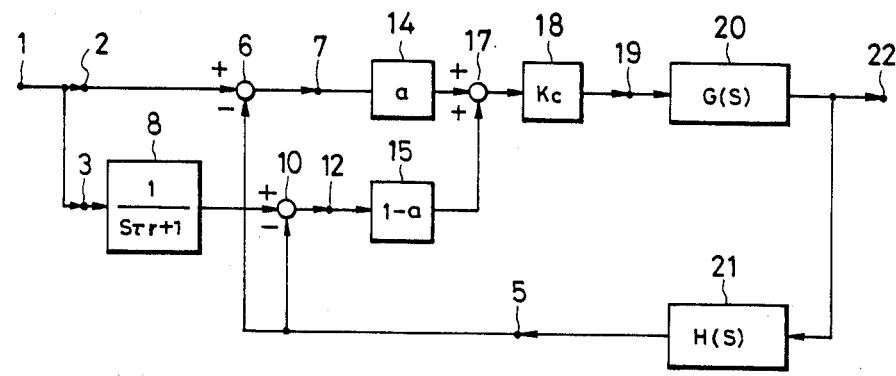
FIG. 2 is a block diagram of a control system for practising one embodiment of the present invention.

FIG. 2 is a block diagram of a control system for practicing one embodiment of the present invention, and like reference numerals are used to identify like portions as in FIG. 1. In FIG. 2, reference numeral 20 represents a controlled system, 21 is a feedback element and 22 is a controlled variable.

In this embodiment, the desired value or the reference value 1 is branched into two parts, and direct comparison 6 is obtained between one of the branches 2 and the feedback variable 5 taken out from the feedback element 21 of the transfer function H(s) to obtain the primary difference value 7. The lag element 8 using the first order lag element of the transfer function $1/(s\tau_r + 1)$ having the delay time $\tau_r$ receives a signal of the other branch 3 to obtain the time difference comparison 10 with the desired value or the reference value 1 and thus obtain the secondary difference value 12. The constant a and the constant 1-a are put to the primary and secondary difference values as the weighting elements 14 and 15, respectively, and then their sum 17 is calculated. The sum is then input into the gain adjustment element 18 having a gain coefficient Kc to produce the operation variable 19 of the controlled system 20 given by the transfer function G(s), and the controlled system 20 is operated so as to output the controlled variable 22 which lets the controlled system 20 follow up the desired value or the reference value 1 or brings it into confirmity with the latter.

In order to compare the characteristics of the versatile time difference comparison compensation method of a control system in accordance with the present invention with the characteristics of the prior art technique from the fundamental viewpoint, each of step response in two cases of unity feedback system, that is, H(s)=1 but G(s) are different will be hereinafter discussed.

EXAMPLE 1:

The first example represents the case where the controlled system 22 contains a dead time $\tau$ and the transfer function is given by:

$$G(s) = \frac{0.2e^{-s\tau}}{s(s^2 + 0.5s + 0.5)} \quad (1)$$

Figure 3:
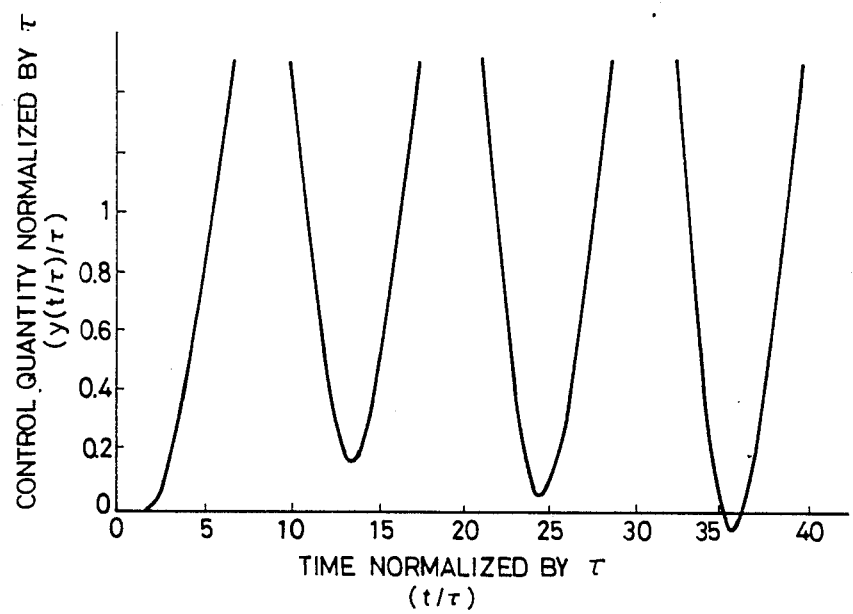
FIG. 3 is a diagram showing step response in a unity feedback system without compensation when the transfer function G(s) of a controlled system is expressed by a later-appearing formula (1)
Figure 4:
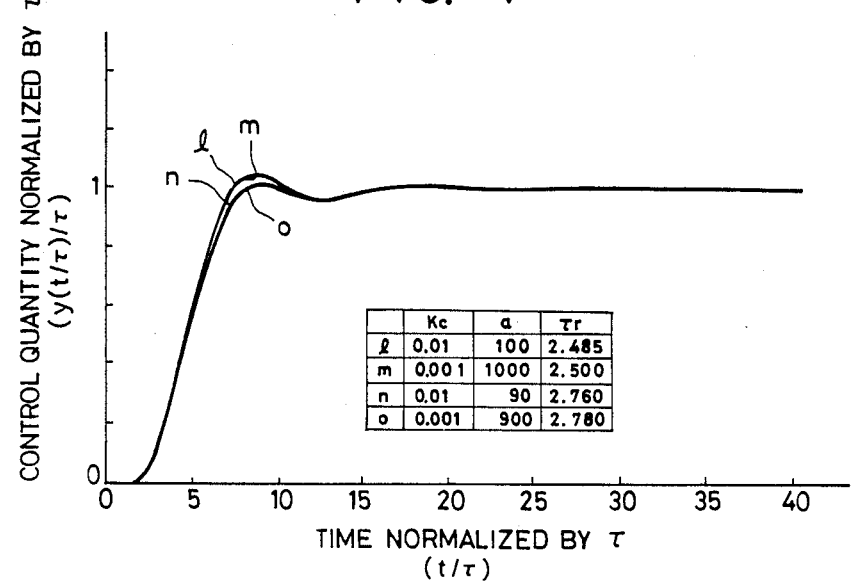
FIG. 4 is a diagram showing the step response in the embodiment of the present invention shown in FIG. 2.

FIG. 3 shows the step response when the simplest unity feedback system without any compensation is formed in accordance with the prior art technique. From this diagram, instability can be understood. FIG. 4 shows the step response when Kc, a and $\tau_r$ values are adjusted to the optimum values in the versatile time difference comparison compensation method of a control system in accordance with the embodiment of the present invention shown in FIG. 2. In the diagram, an example of the combination which is believed to be an optimum combination of each of the constants Kc, a and $\tau_r$ is applied to l~o in the diagram, but there exist numerous combinations in practice.

Figure 5:
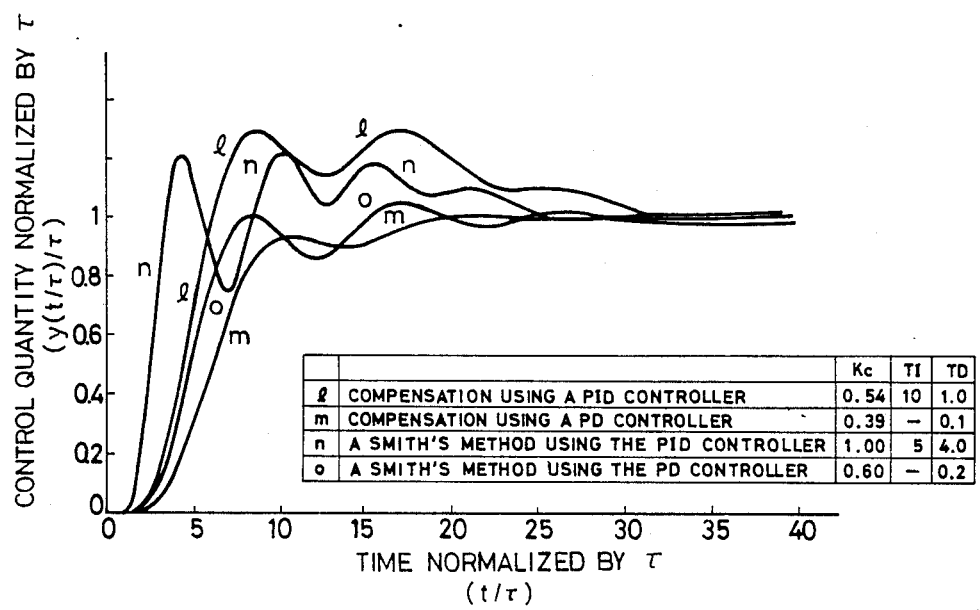
FIGS. 5 and 6 are also diagrams showing the step response in conventional compensation methods, respectively.
Figure 6:
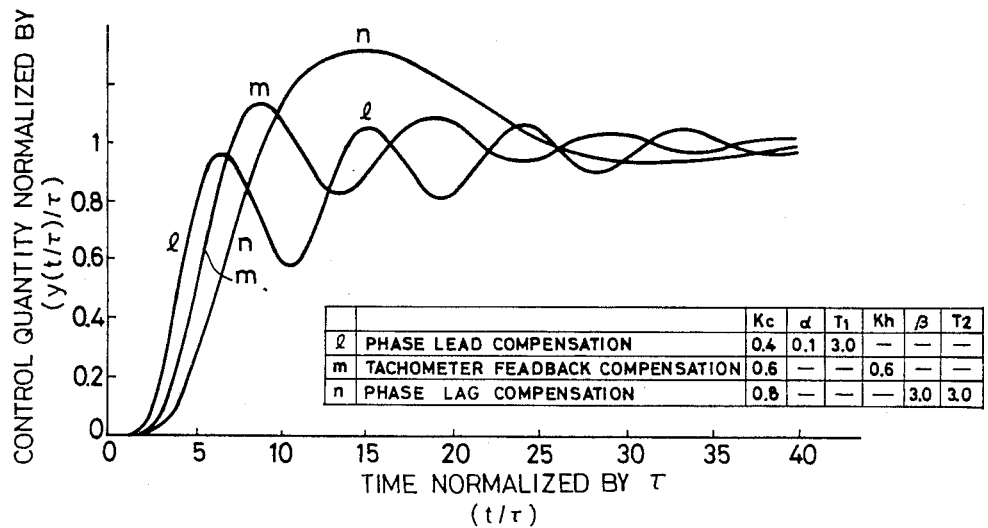

FIGS. 5 and 6 show the step responses when the conditions are adjusted to the state which is believed optimal by each of the compensations using a PID controller, a PD controller, a Smith's method using the PID controller, a Smith's method using the PD controller, phase lead compensation tachometer feedback compensation, and the phase lag compensation which are each of the conventional analog control technique. In FIG. 5, the data of the proportional gain Kc of the PID or PD controller, the integration time constant TI normalized by the dead time $\tau$ contained in G(s) and the differentiation time constant TD normalized by $\tau$ are also added. In FIG. 6, the data of each of the proportional gain Kc of each compensator, the tachometer feedback gain Kh and the reference time constant T1 normalized by the $\tau$ value of the phase lead compensation, the ratio $\alpha$ between two time constants of the phase lead compensation, the reference time constant T2 normalized by $\tau$ of the phase delay compensation and the ratio $\beta$ of two time constants of the phase delay compensation are added. The abscissa in these diagrams represents the time $t/\tau$ normalized by $\tau$ while the ordinate represents the controlled variable $y(t/\tau)/\tau$ normalized by $\tau$.

It can be understood from the comparison of these diagrams of FIGS. 5 and 6 with FIG. 4 that whereas each of the prior art compensation methods is quite unusable in the case of Example 1, the versatile time difference comparison compensation method of a control system in accordance with the present invention provides by far excellent quick response and dispersibility. Moreover, the versatile time difference comparison compensation method of a control system in accordance with the present invention provides a by far smaller Kc value and this means that the gain margin is great and sufficient stability is guaranteed. Furthermore, the optimum Kc value can be selected from a wide range as can be under stood from the data added to FIG. 4.

In the case such as in Example 1 where the controlled system 20 contains the dead time $\tau$, it is not possible to say definitely that the design method of digital control has been established, and comparison with digital control will be made in the following Example 2 where $\tau$ is not contained.

EXAMPLE 2:

This example represents the case where the transfer function of the controlled system 20 is given by:

$$G(s) = \frac{0.2}{s(s^2 + 0.5s + 0.5)} \quad (2)$$

Figure 7:
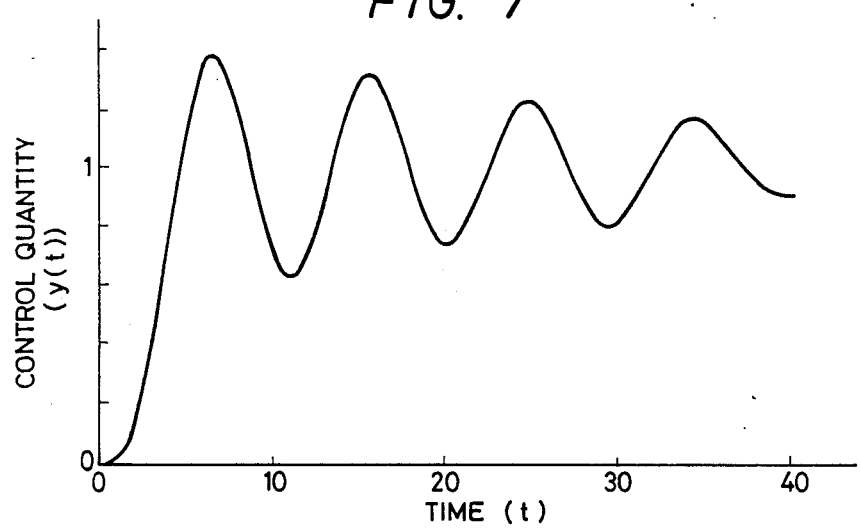
FIG. 7 is a diagram showing the step response in a unity feedback system without compensation when the transfer function G(s) of the controlled system is expressed by a later-appearing formula (2)
Figure 8:
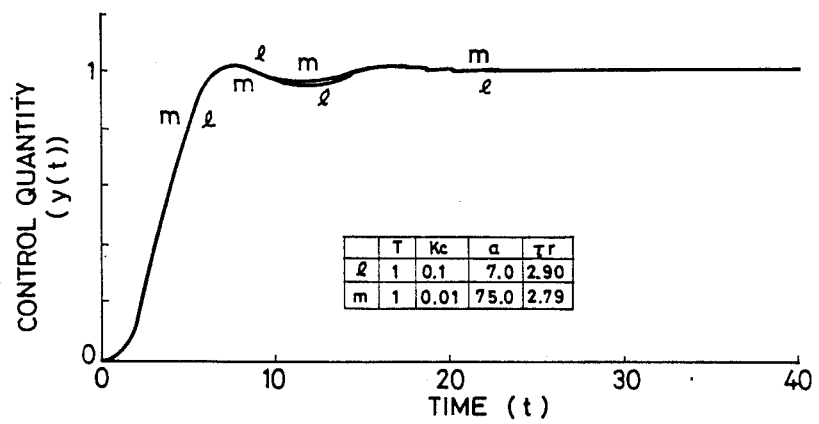
FIG. 8 is a diagram showing the step response in the embodiment of the present invention shown in FIG. 2.
Figure 10:
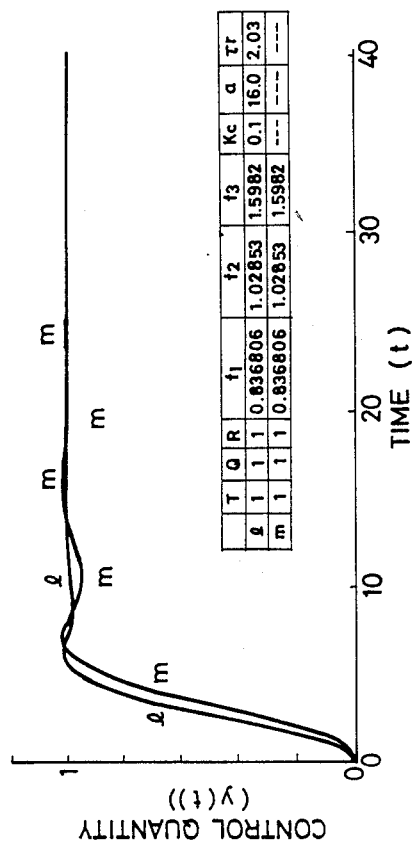
FIG. 10 is a diagram showing the step response in the case of FIG. 9 in comparison with the step response of a conventional optimal control method.

FIG. 7 shows the step response when the simplest unity feedback system is formed without any compensation in accordance with the prior art technique. It can be seen from this diagram that controllability is low. FIG. 8 shows the step response when the desired value or the reference value and the feedback variable are sampled and held at a sample time T=1, the architecture employs digital signal processing and the Kc, a and $\tau_r$ values are adjusted to the optimum values on the basis of the versatile time difference comparison compensation method of a control system in accordance with the present invention shown in FIG. 2. Two combination examples, which are believed to be the optimum combinations of Kc, a and $\tau$, are given to l and m in the diagram, but numerous combinations exist in practice. In FIGS. 8 and 10, the abscissa represents the time (t) and the ordinate does the response y(t).

The response shown in FIG. 8 by the time difference comparison compensation method of a control system in accordance with the present invention is extremely analogous to the response curve m of FIG. 10 by the later-appearing optimal control method of the prior art technique and exhibits equivalent characteristics. Therefore, the method of the present invention can be said to be one close to the ultimate control methods, and a sufficiently large gain margin can be secured by selecting the Kc value below 1. Moreover, the design, architecture and adjustment can be made incomparably more easily by the versatile time difference comparison compensation method of a control system in accordance with the present invention than by the prior art technique, and the margin as well as versatility can be secured for the design, architecture and adjustment because the combinations of the constants to be adjusted, which are believed to be optimum combinations, exist over a wide range.

Figure 9:
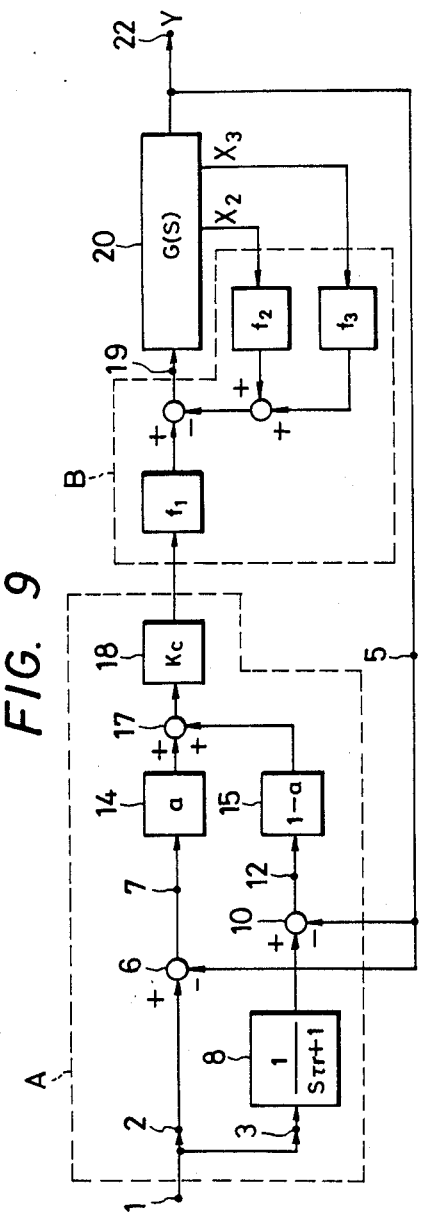
FIG. 9 is a block diagram of a control system for practising another embodiment of the present invention when the control system is incorporated in optimal control.

FIG. 9 shows a control system for practicing another embodiment of the present invention when the control system is incorporated in the optimal control method as one of the conventional digital control technique. Symbols $f_1$, $f_2$ and $f_3$ represent optimal regulators by complete state feedback. In the same way as described above, the desired value or the reference value and the feedback variable are sampled and held, and the lag element 8 described by $1/(s\tau_r+1)$ is again expressed by a difference equation for digital signal processing. Symbols A and B in the diagram represent a time difference comparison compensator and optimal regulator, respectively. A response curve l in FIG. 10 represents an example of optimum step response given by the system containing the present invention and constructed of the block diagram of FIG. 9 when the sample time T=1.

The response curve m in FIG. 10 represents the step response by the optimal control method which has been used most ordinarily among the conventional digital control methods. It represents the optimum case of quickness of response and dispersibility when the sample time T=1 by use of the optimal regulator (f$_1$, f$_2$, f$_3$) by the complete state feedback. Here, the weighting coefficients (matricies) relating to the state variables vector and relating to the input variable which both appear in the performance index are each $$\begin{pmatrix} Q & 0 & 0 \\ 0 & 0 & 0 \\ 0 & 0 & 0 \end{pmatrix}$$

and R, respectively. Among the state variables vectors $X^T = (x_1, x_2, x_3)$, $x_1$ is the controlled variable and the input variable represents the manipulation variable.

When the sample time is set to T=1, the optimum values of quickness and dispersibility of the response are Q=1 and R=1, and in this give to condition give to the response curve m is obtained in FIG. 10. If the sample time is determined in the manner described above, the values Q and R providing the optimum quickness and dispersibility of response are determined. Accordingly, it can be understood that design versatility drops secondarily.

When the response curve l by the present invention compared with the optimal response curve m by the prior art technique, it can be understood that a remarkable improvement is accomplished in quickness of response and reduction of dispersibility. Moreover, since the Kc value can be selected from a wide range, the large gain margin can be secured and margin and versatility can also be secured for design and adjustment.

As described above, the versatile time difference comparison compensation method of a control system in this invention can be applied to analog control by employing the analog system for the architecture and also to digital control by sampling and holding the desired value or the reference value and the feedback variable and employing the architecture for digital signal processing. Furthermore, when incorporated in the conventional digital control, the method of this invention can further improve the control characteristics. Naturally, the block diagram can be re-edited by making its equivalent conversion.

The versatile time difference comparison compensation method of a control system of this invention has the construction described above and makes feedback control by compensating for the response delay of the controlled system by utilizing the time difference comparison with the feedback variable by branching the desired value or the reference value that has not been employed conventionally. Accordingly, this invention can improve drastically quickness of the response and reduce dispersibility in a comparison with any of the conventional compensation methods which are equipped with various compensation or adjustment functions after obtaining the comparison difference such as analog control. Furthermore, the direction of adjustment to accomplish these objects results in the drastic expansion of the gain margin so that stability of controllability can be further improved. In comparison with the conventional digital control methods, the method of this invention exhibits excellent characteristics equivalent to those of the conventional digital control methods, and can be also applied to digital control under the present situation where it is not possible to say that the control method or compensation method of digital control has been established in the case where the dead time attendant to many controlled systems and/or the delay by the processing time of a microprocessor cannot be neglected. In other words, the present invention can be applied versatilely to all kinds of control equipment and control systems, can be designed and constituted incomparably easily and can be adjusted or re-adjusted through a simple operation in comparison with conventional digital control which requires not only a large number of days and a great deal of labor for its design and architecture but also redoing of design and architecture from the beginning with only a limited change of the controlled system and which is difficult to handle.

In other words, the present invention can improve quickness of response and reduce dispersibility in the feedback control system constituting all kinds of control equipment and control systems such as continuous-data feedback control systems and process control systems, to say nothing of servo mechanisms, in any industrial fields. Moreover, the present invention can improve drastically stability and can be adjusted or set easily in order to accomplish these objects.

I claim:
1. A versatile time difference comparison compensation method of a control system comprising the steps of:
   branching a reference value of feedback control into a primary and n number of branches;
   comparing said primary branch directly to a feedback variable to obtain a primary difference value;
   transmitting said n number of branches of said reference value through lag elements having various delay times;
   comparing said n number of branches being transmitted through respective lag elements to said feedback variable to obtain n difference values;
   transmitting said difference values through various weighting elements to multiply said difference values by various weights and to obtain weighted signals;
   calculating the sum of said weighted signals to obtain a sum signal; and
   transmitting said sum signal through a gain adjustment element to re-adjust a gain of said sum signal to be output to a controlled system to produce an operation value.

2. A versatile time difference comparison compensation method of a control system according to claim 1, wherein only two of said primary difference value and said n difference values are set as said difference value.

3. A versatile time difference comparison compensation method of a control system according to claims 1 or 2, wherein each of said lag elements is set by at least one element selected from an element which causes a firstorder lag and other various elements each of which causes signal delay such as a dead time element.

4. A versatile time difference comparison compensation method of a control system according to claims 1 or 2, wherein some of said weighting elements and said gain adjustment element can include elements such as PID controllers, PI controllers, and integrators as countermeasures for disturbance.

5. A versatile time difference comparison compensation method of a control system according to claims 1 or 2, wherein the delay time of each of said lag elements, the weight value of each of said weighting elements, and the gain coefficient of said gain adjustment element, can be set and adjusted.

6. A versatile time difference comparison compensation method of a control system according to claims 1 or 2, wherein said control system is constituted as a versatile controller or a versatile control IC such as an analog IC or a digital IC.

* * * * *